May 13, 1952  B. H. DONAHUE ET AL  2,596,133
ATTACHMENT FOR CUTTING TORCHES
Filed Aug. 16, 1948
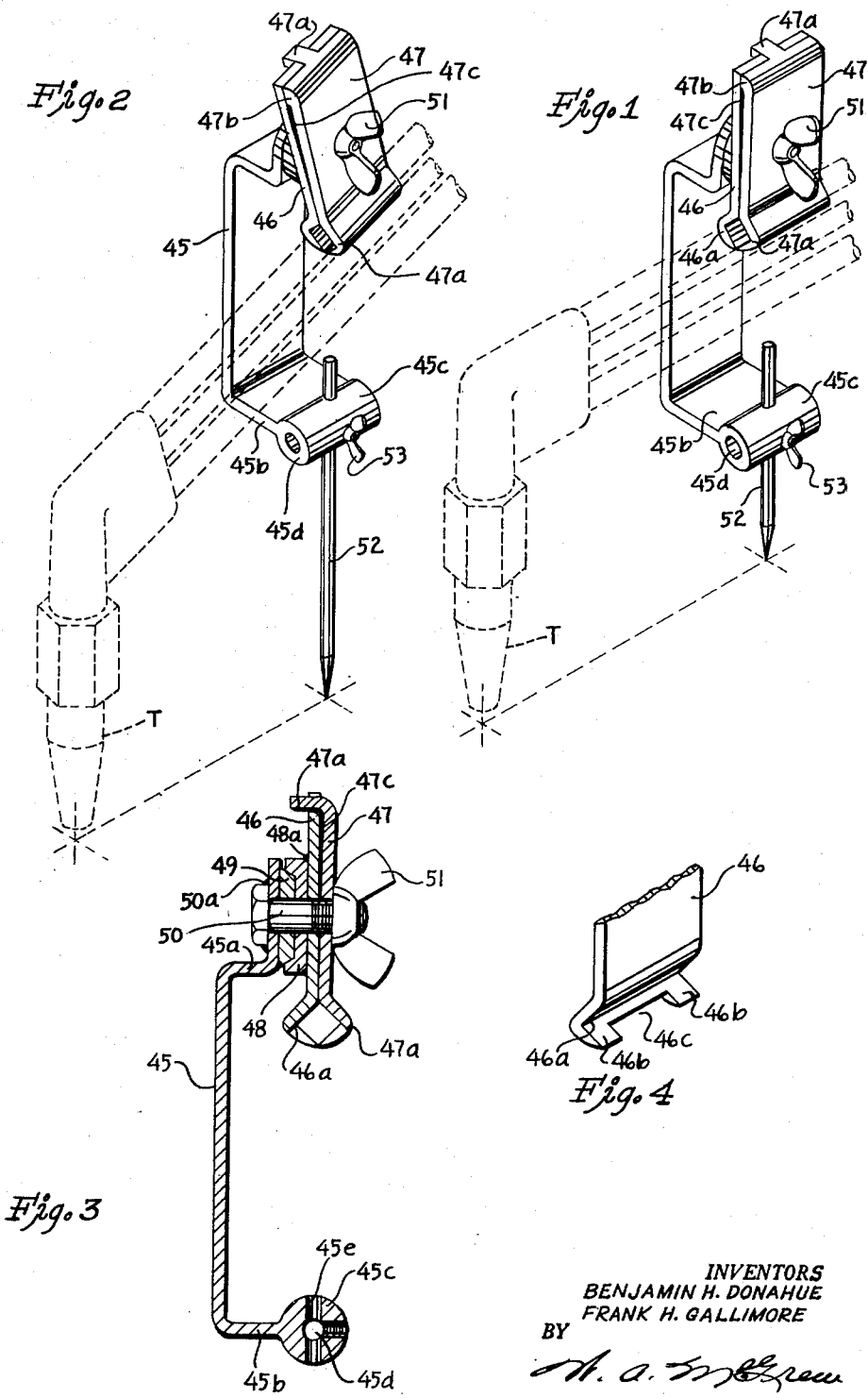
INVENTORS
BENJAMIN H. DONAHUE
FRANK H. GALLIMORE
BY
ATTORNEY Patented May 13, 1952

2,596,133

UNITED STATES PATENT OFFICE 2,596,133

ATTACHMENT FOR CUTTING TORCHES

Benjamin H. Donahue and Frank H. Gallimore, Pueblo, Colo.

Application August 16, 1948, Serial No. 44,563

3 Claims. (Cl. 266—23)

The present invention relates to attachments for cutting torches. It has to do particularly, although not exclusively, with attachments for conventional acetylene cutting torches of various types and sizes and which serve to guide the torch during the cutting operation so as to make perfect, or substantially perfect, straight-line cuts in metal plates, and the like, as well as circular cuts in metal plates. The attachments are adapted particularly for use in connection with hand-operated acetylene cutting torches which are free to be moved over the surface or surfaces of the work to be cut and which normally have to be guided over a chalk line by the hand of a skilled operator.

It is common practice to hand-guide a cutting torch to produce a cut in a piece of metal and since the cutting torch must be held entirely by hand and maintained in a given position with relation to the work, the operator is subjected to considerable physical strain in an effort to follow a guide line and thus produce an accurate, or nearly accurate, cut. It is essential for him to wear the usual dark glasses worn by welders and because of this, it is necessary for him to crouch over the work, getting his eyes as close to it as possible while holding the cutting torch in a given position, in order that he may see and thus follow a chalk line which has been previously placed upon the work to guide him during the cutting operation. Such practice, which is generally the practice followed today, is very tiring to the operator and as the result, the amount of cutting which can be done by an operator in a given period of time is necessarily limited due, at least partly, to the fact that the operator must rest between cutting jobs to overcome fatigue.

Apparatus having a plurality of welding or cutting tips has been provided for the purpose of permitting accurate welding along given seams in work pieces, and for cutting of metal plates, but such apparatus has been extremely costly and for this reason has been beyond the reach of most small welding concerns due to its high price. Moreover, it has not been a good investment for them because it was limited in its scope of usefulness. Welding and cutting devices and machines have been on the market for a long while but have had only a very small acceptance for various reasons. For example, their use was limited since they were not designed for universal application. Moreover, they were not easily and quickly attachable to a cutting torch tip and, when attached, were difficult to adjust. The wheels for supporting known devices of the foregoing character were of the broad rim type which encountered considerable interference from small slag particles which were blown over the work surface as the cut progressed. Another objection to devices of the prior art was the fact that because of their structure and nature, the operator had to crouch over the device and even then had insufficient vision to permit satisfactory work, partly because he had to wear goggles with very dark lenses.

One of the objects of the present invention is to provide attachments for hand type cutting torches which permit their use to make accurate cuts in work pieces without necessarily requiring the services of a skilled operator and without subjecting the operator to unnecessary strain as would be the case with previously known cutting equipment.

Another object of the present invention is to provide improved means for detachable association with cutting torches of various sizes and kinds which permits the accurate cutting of work pieces either in a straight line or in a circle, said means serving to guide the cutting torch which makes it unnecessary to follow previous practice which necessitates marking the work and observing that mark during the cutting operation; a further object being to permit the cutting torch to follow a chalk line on the work accurately while the operator, because of the good visibility which the attachment permits, may assume an "at ease" position behind the torch and permits his use of goggles of lighter shade because of his greater distance from the flame, thus increasing his range of visibility beyond that of an operator who was required to use extremely heavy and dark goggles because of the fact that his eyes were necessarily maintained considerably closer to the torch flame in accordance with previous practice.

A further object of the present invention is to provide improved attachments for supporting and guiding the tip of a cutting torch either in a straight line or in a circular path; it being another object of the invention to provide an adjustable center pin or member which may be quickly and easily applied to and removed from a cutting torch.

The foregoing and other objects and advantages of the present invention will appear from the following description and appended claims when considered in connection with the accompanying drawings forming a part of this specification, wherein like reference characters designate corresponding parts in the several views.

In said drawings:

Fig. 1 is a perspective view of an adjustable center point attachment for a torch permitting the accurate cutting of circles or parts thereof.

Fig. 2 is a view similar to Fig. 1, showing the attachment of Fig. 1 applied to a torch in which the pipes are arranged at a different angle with relation to the tip.

Fig. 3 is a vertical section through the center point attachment as it is shown in Fig. 1.

Fig. 4 is a fragmentary perspective view of one of the clamping jaws of the attachment of Figs. 1, 2 and 3.

Referring now particularly to Figs. 1 to 4, inclusive, there is shown one form of center point or circle scribing attachment for cutting torches of various shapes, sizes, and arrangement of tubes. In some instances, tubes of a cutting torch extend at right angles from the torch tip, as seen in broken lines in Fig. 1 and in other instances, the tubes extend from the torch tip at an obtuse angle, such as indicated in broken lines in Fig. 2.

The attachment of these figures of the drawings comprises, as shown, a body member 45, to the upper end of which a pair of swingable, as well as adjustable, clamping members 46 and 47 are attached. The clamping member 46 carries a female member or socket 48 of a wedge-like coupling including a male member 49. The female member 48 is preferably secured to the back of clamp member 46 by welding or soldering, as indicated at 48a, Fig. 3. Clamp member 46 is notched out along one edge to receive the projecting tongue 47a of clamp member 47. At opposite sides of the tongue, clamp member 47 is provided with shoulders or raised heels 47b, one such being shown in each of Figs. 1 and 2. These shoulders engage the adjacent face of clamp member 46 and provide a tapered space, such as is shown at 47c. The preferred normal position is when the two clamping members or jaws are substantially parallel and grasping an average size tube. The lower end of clamp member 46 is provided with a transverse groove 46a and with a flange having a central removed portion 46c providing end fingers 46b, see Fig. 4. The lower end of clamping member 47 may be similarly formed. Thus, the two pairs of spaced opposed fingers, similar to those shown at 46b in Fig. 4, serve to tightly grip one of the tubes or pipes of the torch when the attachment is applied to said torch and when a wing nut 51 on a bolt 50 is tightened down. As seen in Fig. 3, bolt 50 is secured to body member 45 by welding or soldering, as indicated at 50a. Since the bolt 50 passes through openings in the socket members 48 and 49 and the clamping members 46 and 47, when wing nut 51 is loosened, the clamping members may be swung, as a unit, from the vertical position of Fig. 1 to the inclined position of Fig. 2. By shifting the parts to the position of Fig. 2, the clamping device is easily adapted for use with the obtuse angle torch tubes shown in this figure. The approximate setting is obtained by eye when mounting the device upon the torch tube and this swinging action provides a convenient differential for correcting the rough (by eye) setting. This same feature also provides a helpful means for obtaining the correct cutting radius.

If desirable, the clamping members 46 and 47 may be swung from the position of Figs. 1 and 2 through 180 degrees so that the clamping ends of the members may be engaged with the lower tube of the cutting torch shown in Figs. 1 and 2. Thus, the attachment in effect would be lengthened and the center pin carried thereby could reach a surface further removed from the torch tubes. It will be understood that the adjustable and extensible center point attachment may be used with various sizes and types of torches by a matter of simple adjustment.

As seen in Figs. 1, 2 and 3, the body portion 45 has its upper and lower ends 45a and 45b offset. The lower offset portion 45b terminates in a drilled or hollow portion 45c which is provided with a horizontal bore 45d and a vertical bore 45e. The vertical bore 45e carries a center pin 52 which is held in any desired adjusted position by a set screw having a wing type head 53, see particularly Figs. 1 and 2. The center pin has a pointed end which is adapted to be placed in position in a previously formed hole or depression in a work piece at proper position with relation to the cutting tip to permit said cutting tip to describe a circle, or an arc of a circle, having a given or predetermined diameter. It will be understood that by loosening wing nut 51 of the clamping unit, the entire attachment may be slid along the torch tube by which it is supported to vary the distance between the center pin 52 and the cutting torch T. By thus varying the distance between these two members, it is possible to cut circles of different diameters in the work.

The normal space 47c, between members 46 and 47 adjacent their non-clamping ends, permits the clamping opposite ends of these members to be spread apart and grip tubes of various diameters. The clamping members are arranged so as to allow clamping of the average diameter torch tube, with the members 46 and 47 remaining in substantially parallel planes. By so constructing the clamping member, with the shoulders 47b, tubes of less than average diameter, as well as tubes of greater than average diameter, may be easily and tightly gripped by the device.

Having thus described the invention what is claimed is:

1. In a center pin attachment having a body provided with upper and lower offset end portions, the lower offset end portion providing means for supporting a center pin, and the upper offset portion providing means for supporting rotatable and adjustable clamping means, and rotatable and adjustable clamping means carried by the upper offset end portion and comprising a pair of plate-like members and means engaging said members for adjusting the members relative to one another for causing them to clamp a tube of the torch structure and to hold the clamping means against movement relative to the body, one of said clamping members having heel portions whereby to adapt the clamping device for use with tubes having a wide range of diameters.

2. Structure according to claim 1, wherein the clamping plate-like members have opposed spaced pairs of finger portions for gripping the tube of the cutting torch.

3. Structure according to claim 1, wherein the clamping means includes a pair of relatively rotatable round interfitting and cooperable wedge-like friction members whose frictional contact holds the clamping member in predetermined adjusted position.

BENJAMIN H. DONAHUE.
FRANK H. GALLIMORE.

(References on following page)

REFERENCES CITED

The following references are of record in the file of this patent:

UNITED STATES PATENTS

| Number | Name | Date |
|---|---|---|
| 1,141,560 | Lack | June 1, 1915 |
| 1,351,846 | Forster | Sept. 7, 1920 |
| 1,384,105 | Starrett et al. | July 12, 1921 |
| 1,553,508 | Cloud | Sept. 15, 1925 |
| 1,564,636 | Smith | Dec. 8, 1925 |
| 1,773,664 | Eberle | Aug. 19, 1930 |
| 1,780,814 | Cregger | Nov. 4, 1930 |
| 1,792,317 | Marsh | Feb. 10, 1931 |
| 1,947,448 | Ahola | Feb. 20, 1934 |
| 2,018,259 | Hartley | Oct. 22, 1935 |
| 2,281,814 | Willoughby | May 5, 1942 |
| 2,442,505 | Millett | June 1, 1948 |